Nov. 25, 1930.    G. BOELLA    1,782,457
SHOCK ABSORBER
Filed July 11, 1928    2 Sheets-Sheet 1
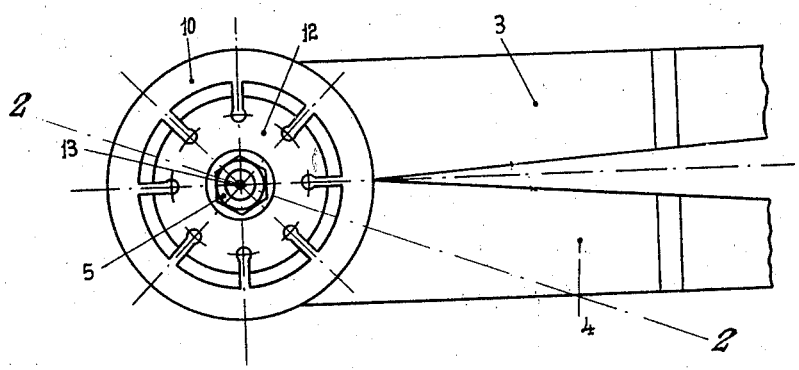
Fig. 1.
Fig. 3
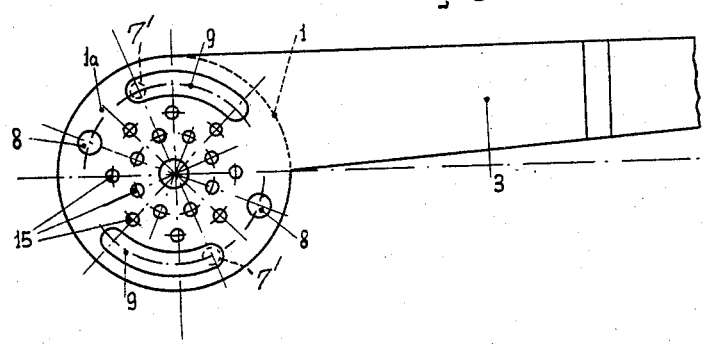
Fig. 4
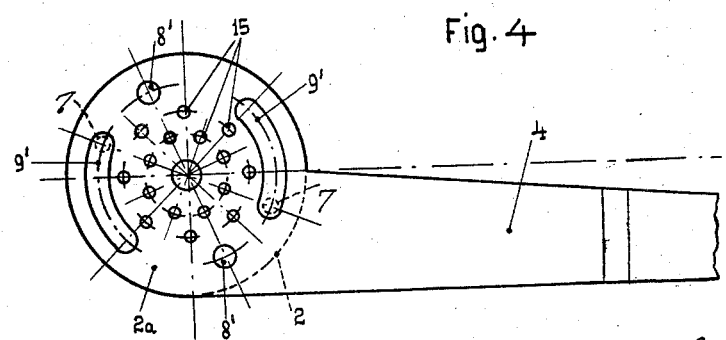
Inventor
Giovanni Boella
By Henry Orth
    Atty.

Patented Nov. 25, 1930

1,782,457

UNITED STATES PATENT OFFICE

GIOVANNI BOELLA, OF TURIN, ITALY, ASSIGNOR TO SOC. AN. OFFICINE DI VILLAR PEROSA, OF TURIN, ITALY

SHOCK ABSORBER

Application filed July 11, 1928, Serial No. 291,974, and in Italy July 14, 1927.

This invention has for its object improvements in shock absorbers of the type comprising two arms pivoted together at one end like a compass and the other ends of which are connected by suitable means, one to the frame and the other to the axle or bridge of the vehicle, in which the action of absorbing shocks is effected by friction surfaces in contact around the pivotal point of the arms.

According to the present invention the improvements consists essentially of friction surfaces formed of metallic discs connected alternately to one and to the other of the arms and enclosed in a box or case filled with grease or other suitable lubricant, and sufficiently tightly closed to prevent the escape of the lubricant and the penetration of dust and mud to the interior of the case.

The invention also includes the particular form of the heads of the arms corresponding to the form of the discs to which the arms are connected as well as to the means of connection employed; the form and construction of the case; the means employed for inserting the lubricant into the case and the means for regulating the pressure between the discs.

The shock absorber made according to the invention is strong, is easily adjusted, works efficiently and constantly, is cheap and is not influenced by any external substances.

The accompanying drawing shows, by way of example, one form of construction of the shock absorber made according to the present invention.

Fig. 1 is a side elevation.

Figs. 3 and 4 show separately side views of the two arms.

Figure 2:
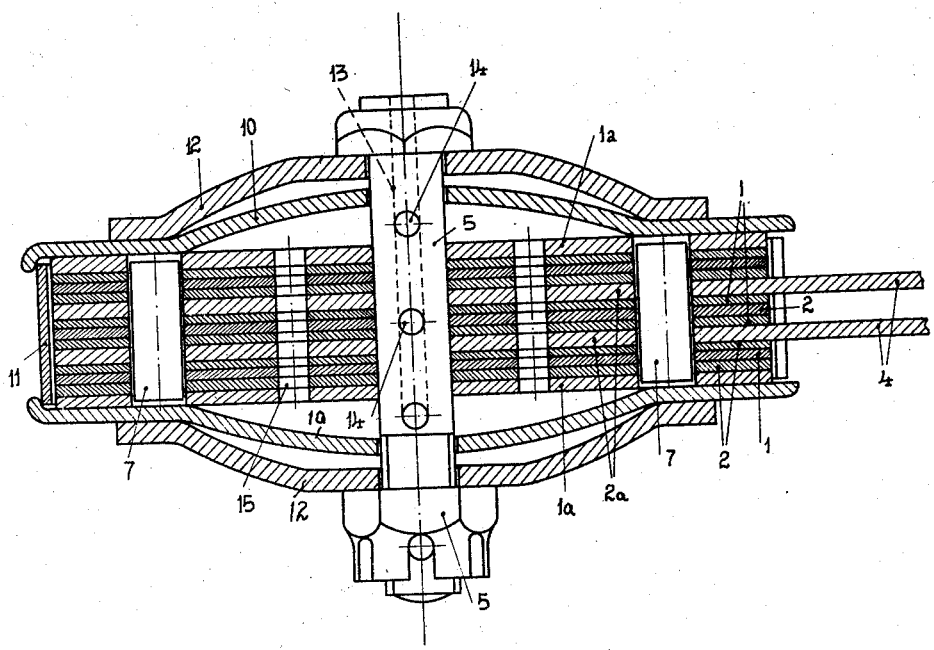
Fig. 2 is an enlarged section through the line 2—2 of Fig. 1.

The drawings do not show the ends of the arms and the attachments which form no part of the invention and may be of any suitable type.

1 and 2 indicate two metallic discs similar in form, but situated in a different manner, as shown in Figures 3 and 4, respectively and as hereinafter explained, so that the discs 1 are fixed to heads $1^a$ of the arms 3 and the discs 2 are fixed to heads $2^a$ of the arms 4. The arm 3 as well as the arm 4 are made from two metal sheets having the outlines as indicated in the drawing. Towards the ends where they are fixed to the frame and to the axle or bridge of the vehicle, pairs of the sheets forming the arms 3 and 4 are in the same plane, whilst towards the other end they are spaced apart and the arms 3 are spaced farther apart from each other than the arms 4. The discs 1 and 2 are arranged in a staggered relation and form three groups (in the example shown each group comprises three discs), of which two lateral groups are comprised between the heads $1^a$ of the arms 3 and $2^a$ of the arms 4, respectively and one central set is comprised between the heads $2^a$ of the arms 4.

The heads $1^a$ of the arm 3 and those $2^a$ of the arm 4 have the same form and details of construction as the corresponding discs 1, 2 and only differ from these latter by the thickness which is greater in the discs 1, 2.

The discs 1 are connected to the heads $1^a$ and the discs 2 connected to the heads $2^a$ by means of bolts 7, 7'. The bolts 7 pass through holes 8 in the heads $1^a$ and discs 1 and the bolts 7' pass through holes 8' in the heads $2^a$ and discs 2, the holes 8' being displaced with relation to the hole 8 as shown in Figs. 3 and 4. To permit the relative rotation of the heads and the discs secured thereto as above described, the heads $1^a$ and discs 1 have sector shaped slots 9 formed therein which register with the holes 8' formed in the heads $2^a$ and discs 2, and the heads $2^a$ and discs 2 have sector shaped slots 9' displaced with relation to the slots 9 and registering with the holes 8.

It will thus be seen that in the operation of the device the arms 3 being secured to the frame of the vehicle and the arms 4 to the axle, the relative movements of the frame and axle will cause a relative movement of the arms and rotate the heads $1^a$ and $2^a$ with their respective discs in opposite directions.

If the arms 3 are moved upward and the arms 4 downward, causing a further separation of the ends of the arms 3 and 4 than is shown in Fig. 1, the bolts 7 will be moved upward in the right hand slot 9' shown in Fig. 4 and the bolt 7' will move downward in the left hand slot 9', in said figure while the bolt 7' will move to the right in the upper slot shown in Fig. 3 and the bolt 7 will move to the left in the lower slot 9 in said figure. With the downward movement of the arms 3 and upward movement of the arms 4 the reverse movements of the bolts in the slots take place.

The movements of the arms in both directions is retarded by the friction of the plates 1 and 2.

The heads of the arms and the corresponding discs are enclosed in a case comprising two caps 10 mounted on a cylindrical collar 11 upon the exterior of which fit the flanged edges of the caps (Fig. 2).

The collar 11 is made from a strip of sheet metal and has parts cut away and slots for the passage of the arms 3 and 4.

The length of the collar 11 is slightly less than the thickness of the group of discs and heads of the arms so as to allow pressure to be exerted between the discs and heads through the two caps 10 of the case. For this purpose there are provided two cup shaped springs 12 arranged externally against the caps 10, which may be compressed by tightening the central bolt 5, constituting the pivot of the two arms 3 and 4.

The bolt 5 is formed with an axial aperture 13 which starts at one end and extends across the whole width of the case. Through this aperture and radial apertures 14 communicating with the aperture 13 there may be introduced grease or other suitable lubricant into the interior of the case by means of a grease pump. The lubricant may thus be renewed in a quick and easy manner.

The discs and the heads of the arms are conveniently provided with holes 15 so as to facilitate the circulation of the lubricant.

What I claim is:

A shock absorber comprising two end heads, each provided with two circular diametrically opposed holes, two diametrically opposed sector-shaped slots situated at 90° with respect to said holes and a central hole, an arm connected with each of said heads and having its outer edge tangent to the corresponding head and the inner edge substantially in radial direction, two intermediate heads equally spaced from one another and from the end heads, arms connected with said intermediate heads and symmetrically arranged with respect to the arms of the end heads, the intermediate heads being provided with holes and diametrically opposed arcuate slots angularly displaced with respect to the holes and slots of the end heads, a set of disks arranged in the spaces between said heads and having holes and arcuated slots registering with the holes and slots of the end heads, a second set of disks alternating with the disks of the first set and having holes and arcuated slots registering with the holes and slots of the intermediate heads, pins located in the holes of one set and passing through the arcuated slots of the other set, a ring embracing the heads and disks and having slots through which said pins pass, removable covers to close the heads and disks in the ring and keep said pins in place, a central bolt to secure the covers in place and elastic members interposed between the covers and the head and nut of said bolt.

In testimony that I claim the foregoing as my invention, I have signed my name.

GIOVANNI BOELLA.